United States Patent
Pallarés Aniorte et al.

(10) Patent No.: US 10,265,239 B2
(45) Date of Patent: Apr. 23, 2019

(54) ACOUSTIC FETAL STIMULATION DEVICE

(71) Applicant: MUSIC IN BABY, S.L., Barcelona (ES)

(72) Inventors: Luis Pallarés Aniorte, Barcelona (ES); María Luisa López-Teijón Pérez, Barcelona (ES)

(73) Assignee: MUSIC IN BABY, S.L., Barcelona (ES)

( * ) Notice: Subject to any disclaimer, the term of this patent is extended or adjusted under 35 U.S.C. 154(b) by 471 days.

(21) Appl. No.: 14/397,351

(22) PCT Filed: Mar. 26, 2014

(86) PCT No.: PCT/ES2014/070227
§ 371 (c)(1),
(2) Date: Oct. 27, 2014

(87) PCT Pub. No.: WO2015/144942
PCT Pub. Date: Oct. 1, 2015

(65) Prior Publication Data
US 2016/0250098 A1 Sep. 1, 2016

(51) Int. Cl.
*A61H 19/00* (2006.01)
*A61H 21/00* (2006.01)
(Continued)

(52) U.S. Cl.
CPC ............ *A61H 19/40* (2013.01); *A61H 21/00* (2013.01); *A61H 23/00* (2013.01); *A61H 23/02* (2013.01);
(Continued)

(58) Field of Classification Search
CPC ........ A61H 19/00; A61H 19/30; A61H 19/40; A61H 19/44; A61H 21/00; A61H 23/00;
(Continued)

(56) References Cited

U.S. PATENT DOCUMENTS 3,791,385 A * 2/1974 Davis .................. A61F 13/2051
604/12
4,798,539 A 1/1989 Henry et al.
(Continued)

FOREIGN PATENT DOCUMENTS

CN 2507090 8/2002
DE 298 09 134 9/1998
(Continued)

*Primary Examiner* — Colin W Stuart
(74) *Attorney, Agent, or Firm* — Egbert Law Offices, PLLC

(57) ABSTRACT

An acoustic foetal stimulation device includes a capsule enclosing an element for emitting acoustic stimulation signals, manufactured in a biocompatible (hygienic) maternal and with a size and shape suitable for removable insertion in the vagina, in a position adjacent to the foetus, and an extraction cord for removing the device. The element for emitting the acoustic signals includes a playback system for a predetermined acoustic stimulation signal, complete with control software and a speaker, and an element for wireless communication with the exterior using a remote control to give instructions to the playback system via an RF wireless signal.

1 Claim, 2 Drawing Sheets

(51) Int. Cl.
*A61H 23/00* (2006.01)
*A61H 23/02* (2006.01)
*G09B 5/04* (2006.01)

(52) U.S. Cl.
CPC ..... *A61H 23/0236* (2013.01); *A61H 23/0245* (2013.01); *A61H 19/44* (2013.01); *A61H 2205/087* (2013.01); *G09B 5/04* (2013.01)

(58) Field of Classification Search
CPC ............... A61H 23/02; A61H 23/0245; A61H 2205/087; A61H 23/0236
USPC .............. 601/15, 46, 47, 48; 482/55, 56, 73; 273/317.8, 329, 330, 331, 332, 335
See application file for complete search history.

(56) References Cited

U.S. PATENT DOCUMENTS

| | | |
|---|---|---|
| 4,934,998 A | 6/1990 | Thomas, Jr. |
| 5,407,412 A * | 4/1995 | Plevnik .................. A63B 23/20 482/105 |
| 5,699,558 A | 12/1997 | Min |
| 6,097,822 A | 8/2000 | Min |
| 6,718,044 B1 | 4/2004 | Alleyne |
| 9,776,040 B2 * | 10/2017 | Sedic .................. A61N 1/36007 |
| 2003/0040688 A1 * | 2/2003 | Bauer ..................... A61H 15/00 601/23 |
| 2007/0244416 A1 * | 10/2007 | Sobin ..................... A61H 19/44 601/46 |
| 2009/0161892 A1 | 6/2009 | Servello et al. |
| 2010/0056963 A1 * | 3/2010 | Shaviv .................. A61B 17/42 601/46 |
| 2010/0232618 A1 * | 9/2010 | Haartsen ............... H04L 1/0003 381/80 |
| 2011/0015471 A1 | 1/2011 | Galt |
| 2011/0190579 A1 | 8/2011 | Ziarno et al. |
| 2011/0245737 A1 | 10/2011 | Hawes |
| 2012/0179077 A1 * | 7/2012 | Tuck ..................... A61H 19/44 601/46 |
| 2013/0053630 A1 * | 2/2013 | Wail ..................... A61N 1/0521 600/38 |
| 2013/0211298 A1 * | 8/2013 | Polo Eguia ............ A61H 21/00 601/46 |

FOREIGN PATENT DOCUMENTS

| | | |
|---|---|---|
| EP | 0 538 104 | 4/1993 |
| ES | 1090031 | 9/2013 |
| JP | 11-205878 | 7/1999 |
| NL | 1011226 | 8/2000 |

* cited by examiner

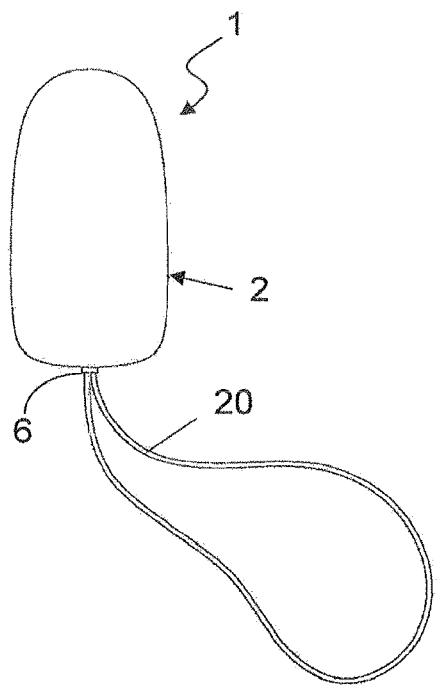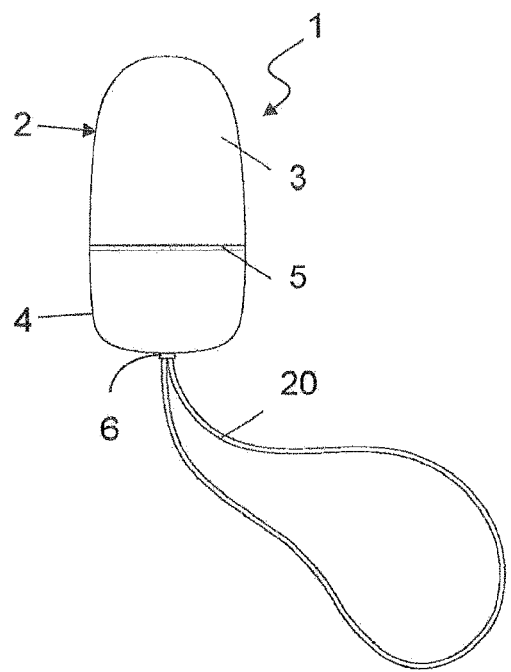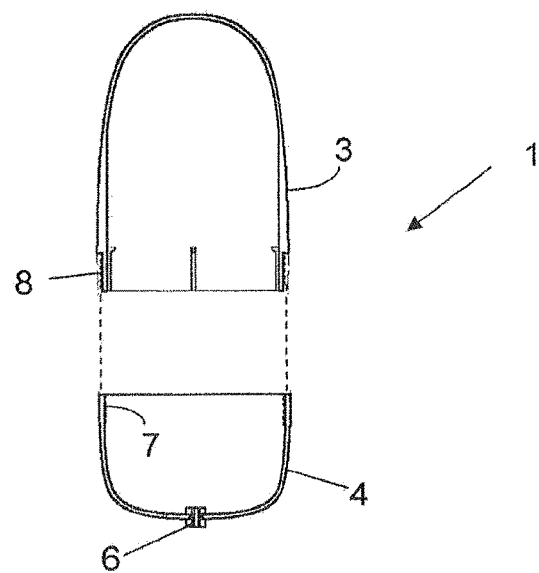

ACOUSTIC FETAL STIMULATION DEVICE

CROSS-REFERENCE TO RELATED APPLICATION

The invention described and claimed hereinbelow is a National Stage Application of PCT/ES2014/070227, filed Mar. 26, 2014, under 35 USC § 371. The PCT application, whose subject matter is incorporated herein by reference, provides the basis for a claim of priority of invention.

BACKGROUND OF THE INVENTION

The present invention, within the obstetrics sector, is an foetal acoustic or sound-based stimulation device of a type comprising a means of emitting acoustic stimulation signals in order that one or more foetuses may be stimulated by, for example, music, voices, vibration and other pre-recorded sounds emitted by a speaker.

The field of application of the present invention falls within the industry sector dedicated to the manufacture of devices intended to achieve foetal or prenatal stimulation.

In medicine, particularly in obstetrics and neurology, it has been scientifically proven that foetal or prenatal stimulation is of great importance to the infant's life. In fact, it is known that the foetus responds to external stimuli while in utero, with its response becoming greater as it develops. Various methods of foetal stimulation exist, one of which is sound-based or auditory stimulation of the foetus (or foetuses).

The results of recent investigations indicate that foetuses and even embryos (Cf. Poster-127: "Impact of exposure to music during in vitro culture on embryo Development" from Human Reproduction, Oxford University Press, accessed via http://humrep.oxfordjournals.org/ 7 Nov. 2013; authors: C. Castello M. Asensio, P. Fernandez, A. Farreras, S. Rovira, J. M. Capdevila, E. Velilla, M. Lopez-Teijon, of the Instituto Marques, Reproductive Biology, Barcelona, Spain), respond to aural stimulation and that the effects of the same may constitute a premature learning experience and have an impact on the behaviour and learning ability of the child after birth.

In the state of the art, experiments and devices with vibroacoustic elements and speakers placed against the abdominal wall are known, as evidenced in patents U.S. Pat. Nos. 4,934,998, 5,699,558, 6,097,822, 6,718,044, JPH11205878A and patent applications US2011015471A1 and US2011245737A1, which describe prenatal audio devices and articles of clothing intended to acoustically stimulate the foetus.

The systems known in the state of the art, including those mentioned above, include elements applied to the exterior of the user's skin, against the external part of abdomen, and may have the disadvantage the their effectiveness could be limited by the presence of a tissue barrier between the point at which the sound or acoustic stimulation signal is emitted and the foetus' ear.

The present invention aims to offer a solution to the aforementioned disadvantage.

SUMMARY OF THE INVENTION

For this reason, the object of the present invention is an innovative foetal audio-stimulation device that, in essence, is characterised in that it comprises a capsule enclosing the means of emitting the signals, manufactured in a biocompatible (hygienic) material, with a size and shape suitable for removable insertion in the vagina in a position adjacent to the foetus and an extraction cord for removing the device.

In accordance with the other characteristics of the present invention, the means of emitting the acoustic signals comprise a playback system for a predetermined acoustic stimulation signal, complete with control software and a speaker, and a means of wireless communication with the exterior using a remote control to give instructions to the playback system via an RF wireless signal.

The device may include an internal memory for acoustic stimulation signals, on which the predetermined signals for playback are recorded.

In this case, the acoustic stimulation signal for playback is sent via the RF wireless signal from an external memory that is separate from the device's means of emitting the signal.

Preferably, but not exclusively, the capsule is ovoid in shape.

In a preferred embodiment of the present invention, the capsule comprises a cap and a lower section which is removably attached to the cap by fastenings, preferably screws, and to which the extraction cord is connected.

The capsule is advantageously manufactured in a biocompatible (hygienic) plastic material, preferably Acrylonitrile Butadiene Styrene (ABS) that is free from phthalates.

The means of emitting the acoustic stimulation signals may incorporate a means of limiting the sound pressure and intensity of the emitted acoustic signal.

The emitted acoustic stimulation signal is made up of a signal or set of signals selected from: vibrations, music, ultrasound and audible sounds.

BRIEF DESCRIPTION OF THE DRAWINGS

A detailed description is given below of the preferred, but not exclusive, embodiments of the foetal stimulation device that is the object of the invention, to aid the understanding of which a set of drawings have been provided as an illustrative, non-restrictive example. In said drawings:

FIG. 1. is a vertical view of a first embodiment of a foetal acoustic stimulation device according to the present invention;

FIG. 2. is the same view as FIG. 1 but of a second embodiment of the invention, with a capsule in two sections;

FIG. 3. is an exploded view of the capsule with cross-sections of the two sections of the device in FIG. 2;

DETAILED DESCRIPTION OF THE INVENTION

Figure 4:
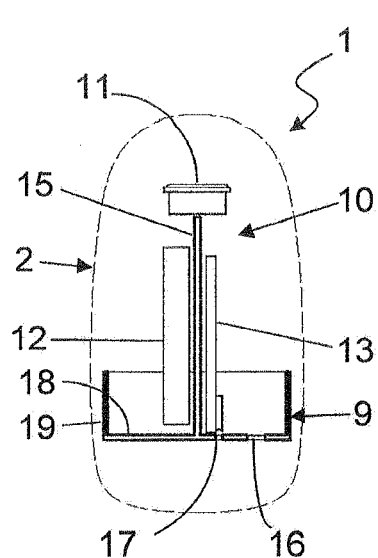
FIG. 4. is a schematic view showing the internal composition of the device in the invention.

From these drawings, it can be seen that the foetal acoustic stimulation device (1) of the present invention comprises:
  a means of emitting (10) acoustic stimulation signals;
  a capsule (2) with an ovoid shape, housing the means of emitting the signals (10), manufactured in one (FIG. 1) or more parts (FIG. 2), in a biocompatible (hygienic)

material and of a size and shaped suitable for removable insertion into the vagina, in a position adjacent to the foetus; and an extraction cord (20) for removing the device (1).

A silicon pressure seal (6) with two holes allows the extractor cord (20) to pass through and be secured inside the capsule (2).

The means of emitting (10) the acoustic signals comprises a playback system (12, 13) for an acoustic stimulation signal, complete with control software and a speaker (11), and a means of wireless communication (21) with the exterior using a remote control (22) to give instructions to the playback system via an RF wireless signal. Said playback system for the acoustic stimulation signal comprises, in addition to the aforementioned speaker (11), a battery (12) and a chip with a memory card (13). The speaker (11) may be a 15 mm.x.0.7 mm 0.4 Ohm speaker. The battery (12) may be a 3.3V battery and the memory card (13) may be an "SD" card.

The emitted acoustic stimulation signal may be a signal or set of signals selected from: vibrations, music, ultrasound and/or audible sounds.

The device (1) includes an internal memory for acoustic stimulation signals, on which the predetermined signals for playback are recorded. Or, alternatively, the acoustic stimulation signal for playback may be sent via the RF wireless signal from an external memory (23) that is separate from the device's means of emitting (10) said signal.

Figure 5:
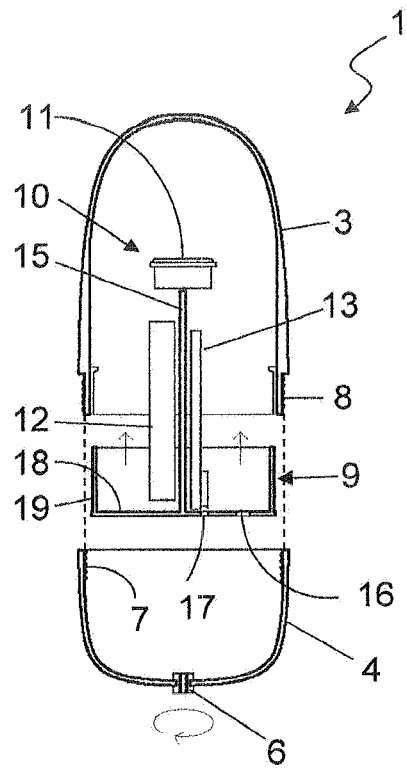
FIG. 5 is an exploded cross-sectional view of the device in the second embodiment as in FIG. 2, in which all components are shown with the exception of the extraction cord.
Figure 6:
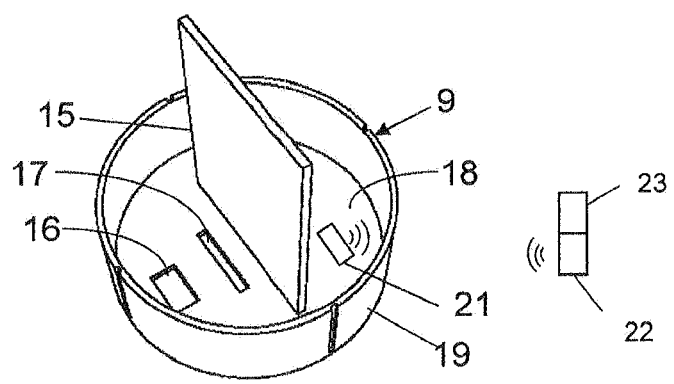
FIG. 6. is a perspective view showing the central part of the device according to the present invention and depicted in FIGS. 4 and 5.

In FIGS. 4, 5 and 6, it can be seen that the device (1) includes an intermediate section (9) with a cylindrical wall (19) sized to fit the inside of the capsule (2), a first opening (16) for a charger and a second opening (17) for a memory card, for example an SD card, in the circular base (18) of said intermediate section (9). A plastic plate (15) serves to hold the device's electronic parts in place.

In the version in FIGS. 2, 3 and 5, the device's (1) capsule comprises a cap (3) and a lower section (4) which can be removably attached to the cap (3) by screws (7, 8), and to which the extraction cord (20) is connected. A silicon seal (5) hermetically seals both sections of the device's capsule.

In both cases, the capsule (2) is manufactured in a biocompatible (hygienic) plastic material that is free from phthalates. The preferred plastic material is Acrylonitrile Butadiene Styrene (ABS).

The electronics for the means of emitting (10) the acoustic stimulation signals include a means of limiting the sound pressure and intensity of the emitted acoustic signal in order to avoid this discomforting or even harming the foetus.

Having sufficiently described the characteristics of the invention and the means of its use, it should be noted that provided that the fundamental principle of the device remains unchanged, it may undergo alterations in its details, including the purpose for which the object of the invention is used. In this sense, the scope of the invention can be extended to other uses for the device in addition to foetal stimulation, such as, for example, as a sex toy.

What is claimed is:

1. An acoustic fetal stimulation device comprising:

a capsule formed of a biocompatible material, said capsule having a cap and a lower section, said cap being removably attached to said lower section, a silicon seal secured between said cap and said lower section so as to hermetically seal an interior of said capsule, said capsule having a size and a shape adapted for removable insertion into a vagina in a position adjacent to a fetus, wherein said capsule has an ovoid shape, said cap secured to said lower section by screws, said biocompatible material is free of phthalates and made of acrylonitrile butadiene styrene;

a speaker entirely enclosed in said capsule and within said cap and said lower section, said speaker adapted to emit acoustic stimulation signals, the acoustic stimulation signals selected from the group consisting of vibrations, music, ultrasound and audio signals;

an extraction cord affixed to said capsule, said extraction cord adapted to allow the capsule to be pulled from the vagina;

a silicon pressure seal with a pair of holes, said extraction cord extending through said pair of holes so that said extraction cord is secured inside said capsule;

a playback system for the emitted acoustic stimulation signals, said playback system having control software, said speaker being cooperative with said control software, said playback system limiting a sound pressure and intensity of the emitted acoustic stimulation signals from the speaker;

a wireless communication device cooperative with said control software, said wireless communication device adapted to be controlled by a remote control outside of said capsule so as to provide instructions to said playback system by a radio frequency signal, an internal memory within said capsule, said internal memory adapted to store the acoustic stimulation signals, wherein the acoustic stimulation signals to be emitted are sent to the playback system via the radio frequency signal from an external memory.

* * * * *